United States Patent [19]

Kunimi et al.

[11] Patent Number: 5,847,090

[45] Date of Patent: Dec. 8, 1998

[54] MONOAZO COMPOUNDS AND PROCESS FOR DYEING OR PRINTING FIBER MATERIALS USING THE SAME

[75] Inventors: Nobutaka Kunimi; Atsushi Inoue, both of Toyonaka; Toshiyuki Araki, Hirakata, all of Japan

[73] Assignee: Sumitomo Chemical Company, Limited, Osaka, Japan

[21] Appl. No.: 868,945

[22] Filed: Jun. 4, 1997

[30] Foreign Application Priority Data

Jun. 5, 1996 [JP] Japan .................................. 8-142884

[51] Int. Cl.$^6$ .......................... C09B 62/51; C09B 62/085; D06P 1/38

[52] U.S. Cl. .......................... 534/605; 534/612; 534/634; 534/635; 534/642

[58] Field of Search ..................................... 534/635, 642, 534/605, 612, 634

[56] References Cited

U.S. PATENT DOCUMENTS

| | | | |
|---|---|---|---|
| 4,631,065 | 12/1986 | Seitz et al. | 534/634 X |
| 4,754,023 | 6/1988 | Tzikas et al. | 534/642 X |
| 5,459,244 | 10/1995 | Kunde | 534/634 |
| 5,541,300 | 7/1996 | Bootz et al. | 534/605 |
| 5,599,911 | 2/1997 | Deitz et al. | 534/634 X |

FOREIGN PATENT DOCUMENTS

| | | | |
|---|---|---|---|
| 60-90265 | 5/1985 | Japan | 534/605 |
| 60-208366 | 10/1985 | Japan | 534/605 |
| 63-175075 | 7/1988 | Japan . | |
| 63-245474 | 10/1988 | Japan . | |
| 7-048521 | 2/1995 | Japan . | |
| 7-188574 | 7/1995 | Japan . | |
| 1576237 | 10/1980 | United Kingdom . | |

*Primary Examiner*—Fiona T. Powers
*Attorney, Agent, or Firm*—Stevens, Davis, Miller & Mosher, L.L.P.

[57] ABSTRACT

A monoazo compound useful for dyeing or printing a fiber material represented by the following general formula (I):

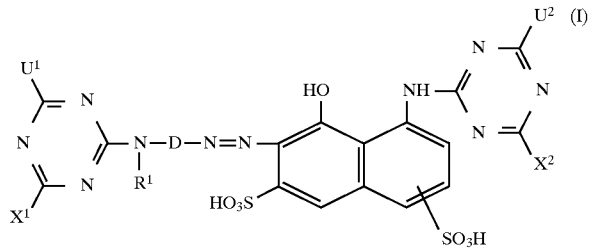

wherein $R^1$ represents a hydrogen atom or alkyl; $U^1$ and $U^2$ represent a group of the following general formula (U1), (U2) or (U3):

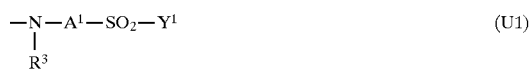

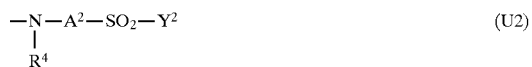

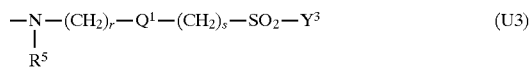

wherein $Y^1$, $Y^2$ and $Y^3$ represent —CH=CH$_2$ or —CH$_2$CH$_2$Z wherein Z represents a group which can be eliminated by the action of an alkali; and $X^1$ and $X^2$ represent halogeno, pyridinio or a group of the following general formula (X1), (X2), (X3) or (X4):

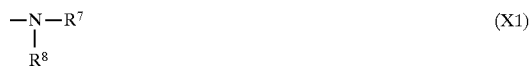

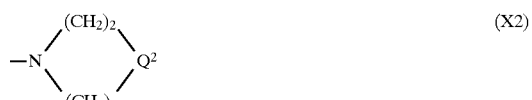

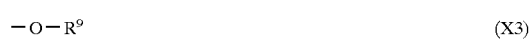

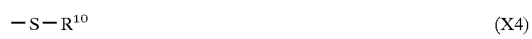

or a salt thereof.

20 Claims, No Drawings

MONOAZO COMPOUNDS AND PROCESS FOR DYEING OR PRINTING FIBER MATERIALS USING THE SAME

BACKGROUND OF THE INVENTION

The present invention relates to monoazo compounds usable as red reactive dyes.

Various reactive dyes have conventionally been known and have found wide applications in the field of dyeing and printing of fiber materials. For example, monoazo compounds as red reactive dyes are disclosed in JP-A-63-175075, JP-A-63-245474 and others.

When used for dyeing or printing fiber materials, these reactive dyes, however, have not necessarily been satisfactory in all of the reproducibility, levelness, build-up property, chlorine resistance, light resistance, perspiration resistance, perspiration-sunlight resistance, acid-hydrolysis resistance and alkali resistance as compared with the higher level of current demands. Therefore, development of a red reactive dye which satisfies all these demands has been desired. Also, in view of rising level of recent demands on dyeing economy and increasing interest on environmental problem, there is a pronounced need for development of a red reactive dye having a high effective exhaustion ratio, being capable of decreasing coloring of dyeing waste and being capable of dyeing at a low salt concentration.

Under these circumstances, the present inventors have conducted extensive studies for developing a dye which, in dyeing or printing treatment, is excellent in reproducibility, is good in levelness, has a high build-up property, has a high effective exhaustion ratio, is capable of dyeing at a low salt concentration and capable of giving red dyed or printed product which is excellent in various fastness, particularly in chlorine resistance, light resistance, perspiration resistance, perspiration-sunlight resistance, acid-hydrolysis resistance and alkali resistance. As the result, they have discovered that monoazo compounds having a specific structural feature have the desired properties and completed the present invention.

SUMMARY OF THE INVENTION

The present invention provides a monoazo compound represented by the following general formula (I):

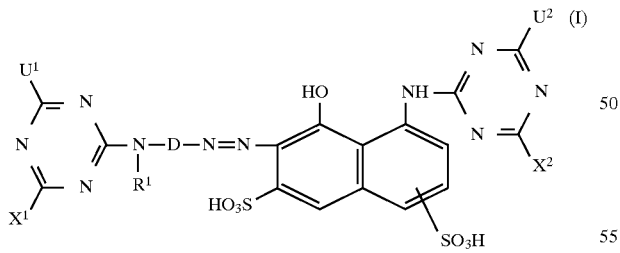

wherein $R^1$ represents a hydrogen atom or alkyl which may be optionally substituted;

D represents a group of the following general formula (II) or (III):

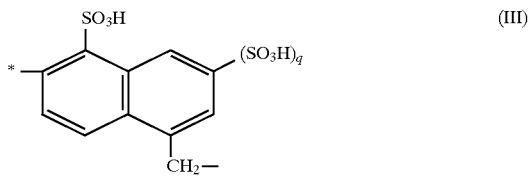

wherein * indicates the bond attached to the azo group,
$R^2$ represents a hydrogen atom, lower alkyl, lower alkoxy, or sulfo, and
p and q, which are the same as or different from each other, each represent 0 or 1;
$U^1$ and $U^2$, which are the same as or different from each other, each represent a group of the following general formula (U1), (U2) or (U3):

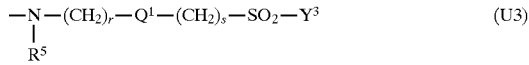

wherein $R^3$, $R^4$ and $R^5$, which are the same as or different from each other, each represent a hydrogen atom or alkyl which may be optionally substituted,
$A^1$ represents phenylene which may be optionally substituted or naphthylene which may be optionally substituted,
$A^2$ represents alkylene which may be optionally substituted,
$Q^1$ represents —O—, —S— or —NR$^6$— wherein $R^6$ represents a hydrogen atom, alkyl which may be optionally substituted or phenyl which may be optionally substituted,
r and s, which are the same as or different from each other, each represent 2, 3 or 4, and $Y^1$, $Y^2$ and $Y^3$, which are the same as or different from each other, each represent —CH=CH$_2$ or —CH$_2$CH$_2$Z wherein Z represents a group which can be eliminated by the action of an alkali; and $X^1$ and $X^2$, which are the same as or different from each other, each represent halogeno, pyridinio which may be optionally substituted or a group of the following general formula (X1), (X2), (X3) or (X4):

wherein $R^7$, $R^8$, $R^9$ and $R^{10}$, which are the same as or different from each other, each represent a hydrogen atom, alkyl which may be optionally substituted, phenyl which may be optionally substituted or naphthyl which may be optionally substituted,
$Q^2$ represents —CH$_2$—, —O—, —S—, —SO—, —SO$_2$— or —NR$^{11}$— wherein $R^{11}$ represents a hydrogen atom or alkyl which may be optionally substituted, and t represents 1, 2 or 3; with the proviso that at least one of $X^1$ and $X^2$ represents pyridinio which may be optionally substituted or a group of the general formula (X1), (X2), (X3) or (X4); or a salt thereof.

The present invention also provides a process for dyeing or printing a fiber material, which comprises using a monoazo compound represented by the above general formula (I) or a salt thereof.

DETAILED DESCRIPTION OF THE INVENTION

In the general formula (I), $R^1$ represents a hydrogen atom or alkyl which may be optionally substituted, as mentioned above.

Such alkyl includes, for example, alkyl having 1–4 carbon atoms and the like. Examples of the substitutent on alkyl represented by $R^1$ include hydroxy, cyano, alkoxy having 1–4 carbon atoms, halogeno, carbamoyl, carboxy, alkoxycarbonyl having 2–5 carbon atoms, alkylcarbonyloxy having 2–5 carbon atoms, sulfo and sulfamoyl.

Specific examples of alkyl represented by $R^1$ include methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3 -chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl 1, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

Preferably, $R^1$ is a hydrogen atom or unsubstituted alkyl and a hydrogen atom, methyl and ethyl are particularly preferred.

In the general formula (1) shown above, D represents a group of the above described general formula (II) or (III). In the general formula (II), $R^2$ represents a hydrogen atom, lower alkyl, lower alkoxy or sulfo. Examples of the lower alkyl represented by $R^2$ include alkyl of 1–4 carbon atoms, such as methyl, ethyl, n-propyl, isopropyl, n-butyl, isobutyl, and sec-butyl. Examples of the lower alkoxy represented by $R^2$ include alkoxy of 1–4 carbon atoms, such as methoxy, ethoxy, n-propoxy, isopropoxy, n-butoxy, isobutoxy and sec-butoxy. Specific examples of the group represented by D in the formula (I) include groups represented by any of the following formulas:

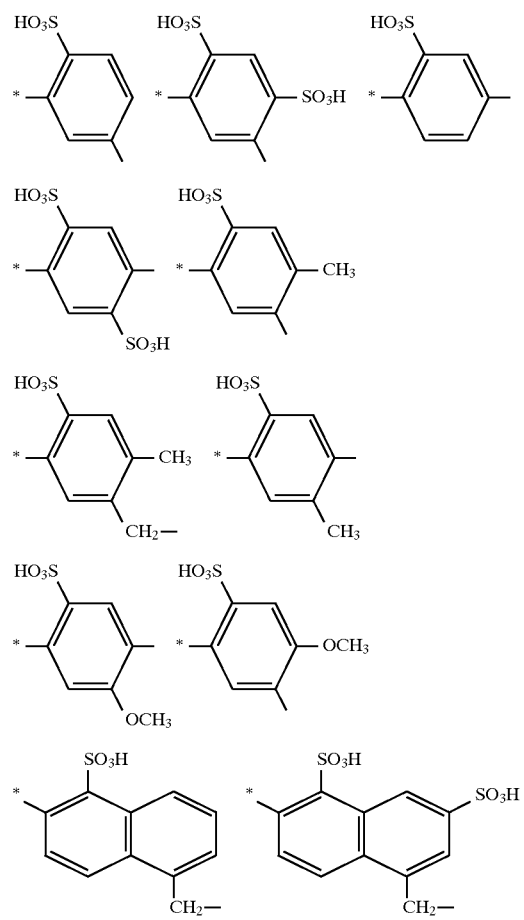

wherein * indicates the bond attached to the azo group.

Among them, preferred examples of D include 2-sulfo-1,5-phenylene which is connected to the azo group at position 1.

In the general formula (I), $U^1$ and $U^2$, which are the same as or different from each other, each represent a group of the above described general formula (U1), (U2) or (U3). In the general formula (U1), (U2) or (U3), $R^3$, $R^4$ and $R^5$ represent a hydrogen atom or alkyl which may be optionally substituted. Examples of the alkyl represented by $R^3$, $R^4$ and $R^5$ include groups similar to those exemplified for $R^1$. Preferably, $R^3$, $R^4$ and $R^5$ are a hydrogen atom, methyl or ethyl. Particularly, a hydrogen atom is preferred for $R^4$ and $R^5$.

In the general formula (U1), $A^1$ represents phenylene which may be optionally substituted or naphthylene which may be optionally substituted.

Examples of the phenylene represesented by $A^1$ include unsubstituted phenylene and phenylene substituted with one or two substitutents selected from the group consisting of halogeno such as chloro and bromo, alkyl having 1–4 carbon atoms, alkoxy having 1–4 carbon atoms and sulfo. Preferred examples are unsubstituted phenylene and phenylene substituted with one or two substituents selected from the group consisting of methyl, ethyl, methoxy, ethoxy, cloro, bromo and sulfo. Specific examples of such preferred phenylene include groups represented by any of the following formulas:

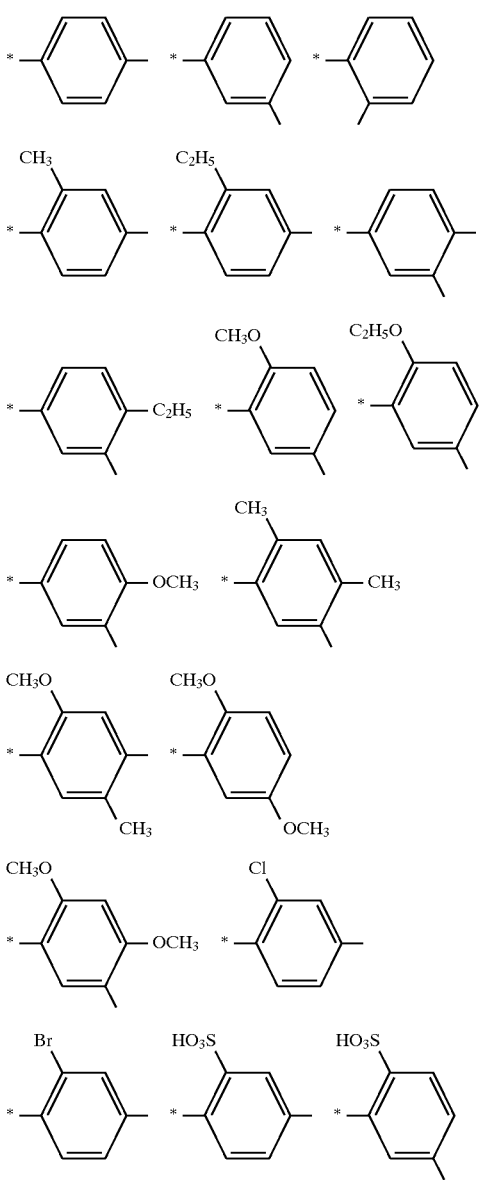

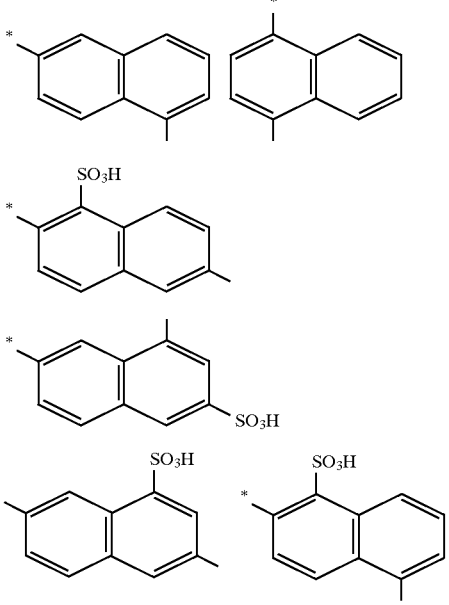

wherein * represents the bond attached to —NR³—. Among them, unsubstituted phenylene and phenylene substituted with one or two groups selected from methyl and methoxy is particularly preferred.

In the general formula (U1), examples of naphthylene represented by A¹ include unsubstituted naphthylene and naphthylene substituted with one or two groups selected from the group consisting of halogeno such as chloro and bromo, alkyl having 1–4 carbon atoms, alkoxy having 1–4 carbon atoms and sulfo. Preferred examples are unsubstituted naphthylene and naphthylene substituted with one or two sulfo groups. Specific examples of such preferred naphthylene include groups represented by any of following formulas:

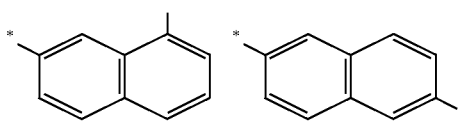

wherein * represents the bond attached to —NR³—.

Preferably, A¹ is phenylene which may be optionally substituted. Particularly, unsubstituted phenylene and phenylene substituted with one or two groups selected from methyl and methoxy is preferred.

In the general formula (U2), A² represents alkylene which may be optionally substituted. Examples of the alkylene represented by A² include alkylene having 2–4 carbon atoms which is unsubstituted or substituted with a substituent selected from the group consisting of alkyl having 1–4 carbon atoms, halogeno, hydroxy, sulfo, cyano, alkoxy having 1–4 carbon atoms, alkoxycarbonyl having 2–5 carbon atoms, alkylcarbonyloxy having 2–5 carbon atoms and carbamoyl. Preferred examples are unsubstituted alkylene having 2–4 carbon atoms, and ethylene and trimethylene are particularly preferred.

In the general formula (U3), Q¹ represents —O—, —S— or —NR⁶— wherein R⁶ represents a hydrogen atom, alkyl which may be optionally substituted or phenyl which may be optionally substituted.

Examples of alkyl represented by R⁶ include alkyl having 1–4 carbon atoms which is similar to the alkyl exemplified for R¹. Examples of phenyl represented by R⁶ include unsubstituted phenyl and phenyl substituted with sulfo.

Preferably, R⁶ is a hydrogen atom, methyl and ethyl.

Among the groups represented by the formula (U3), preferred are those wherein Q¹ is —O— and r and s, which are same or different, are 2 or 3. Specifically, preferred examples of groups represented by the formula (U3) include:

—NR⁵—CH₂CH₂—O—CH₂CH₂—SO₂—Y³,
—NR⁵—CH₂CH₂—O—CH₂CH₂CH₂—SO₂—Y³,
—NR⁵—CH₂CH₂CH₂—O—CH₂CH₂—SO₂—Y³ and
—NR⁵—CH₂CH₂CH₂—O—CH₂CH₂CH₂—SO₂—Y³.

Among them, particularly preferred group is
—NR⁵—CH₂CH₂—O—CH₂CH₂—SO₂—Y³.

In the (U1), (U2) and (U3), Y¹, Y² and Y³ represent —CH=CH₂ or —CH₂—CH₂Z wherein Z represents a group which can be eliminated by the action of an alkali. Examples of the group represented by Z include sulfate ester, thiosulfate ester, phosphate ester, acetate ester and halogen. Among the groups represented by Z, sulfate ester group and chloro are preferred.

Accordingly, preferred examples of groups represented by $Y^1$, $Y^2$ and $Y^3$ in formula (U1), (U2) and (U3) include —CH=CH$_2$, —CH$_2$CH$_2$OSO$_3$H and —CH$_2$—CH$_2$Cl, among which —CH$_2$CH$_2$OSO$_3$H is particularly preferred.

At least one of $U^1$ and $U^2$ in the formula (I) is preferably a group of the formula (U2) or (U3). Inter alia, it is particularly preferred that at least one of $U^1$ and $U^2$ is a group of the formula (U2).

Examples of halogeno represented by $X^1$ and $X^2$ in the formula (I) include fluorine, chlorine and bromine.

Examples of pyridinio represented by $X^1$ and $X^2$ in the formula (I) include unsubstituted pyridinio and pyridinio substituted with one or two substituents selected from the group consisting of carboxy, carbamoyl, sulfo, halogeno and alkyl having 1–4 carbon atoms which may be optionally substituted. Examples of the alkyl as the substituent of pyridinio include 2-hydroxyethyl and 2-sulfoethyl.

Specific examples of such pyridinio include pyridinio, 2-carboxypyridinio, 3-carboxypyridinio, 4-carboxypyridinio, 2-carbamoylpyridinio, 3-carbamoylpyridinio, 4-carbamoylpyridinio, 3-sulfopyridinio, 4-(2-sulfoethyl)pyridinio, 3-(2-hydroxyethyl)pyridinio, 4-chloropyridinio, 3-methylpyridinio and 3,5-dicarboxypyridinio.

Among the pyridinio mentioned above, preferred one is pyridinio substituted with carboxy or carbamoyl. Particularly, carboxypyridinio, inter alia, 3-carboxypyridinio or 4-carboxypyridinio, is preferred.

Examples of alkyl represented by $R^{11}$, in —NR$^{11}$ as $Q^2$ in the formula (X2), include alkyl having 1–4 carbon atoms which is unsubstituted or substituted with alkoxy having 1–4 carbon atoms. Among the groups represented by $R^{11}$, a hydrogen atom, methyl and ethyl are preferred.

Specific examples of the groups represented by the formula (X2) include pyrrolidino, piperidino, piperazino, N-alkylpiperazino and morpholino. Among the groups represented by the formula (X2), those wherein $Q^2$ is —CH$_2$— or —O— and t is 2, such as piperidino and morpholino, are preferred.

Examples of the alkyl represented by $R^7$, $R^8$, $R^9$ or $R^{10}$ in the formula (X1), (X3) and (X4) include alkyl having 1–4 carbon atoms which is unsubstituted or substituted with one or two substituents selected from the group consisting of alkoxy having 1–4 carbon atoms, sulfo, carboxy, sulfamoyl, carbamoyl, hydroxy, halogeno, cyano, carboxylate ester, sulfonate ester, phenyl which may be optionally substituted, sulfato, cyclohexyl, vinyl, amino, acylamino having 1–4 carbon atoms, and amino substituted with one or two alkyl groups having 1–4 carbon atoms. Examples of the phenyl as the substituent of the alkyl include unsubstituted phenyl and phenyl substituted with one or two substituents selected from the group consisting of alkyl having 1–4 carbon atoms, alkoxy having 1–4 carbon atoms, sulfo and halogeno.

More specific examples of such alkyl represented by $R^7$, $R^8$, $R^9$ and $R^{10}$ include alkyl exemplified for $R^1$ described above and further 2-sulfatoethyl, and benzyl which may be optionally substituted for example by sulfo.

Among the alkyl represented by $R^7$, $R^8$, $R^9$ or $R^{10}$, preferred is ethyl, n-propyl, isopropyl, n-butyl, isobutyl, sec-butyl, 2-hydroxyethyl, 2-sulfatoethyl, 2-sulfoethyl, 2-methoxyethyl, 2-carboxyethyl, 2-carbamoylethyl, 2-sulfamoylethyl, benzyl, 2-sulfobenzyl, 3-sulfobenzyl or 4-sulfobenzyl.

Examples of phenyl represented by $R^7$, $R^8$, $R^9$ and $R^{10}$ in the formulae (X1), (X3 and (X4) include unsubstituted phenyl and phenyl substituted with one, two or three substituents, preferably one or two substituents selected from the group consisting of halogeno such as chloro and bromo, alkyl having 1–4 carbon atoms optionally substituted by sulfo, alkoxy having 1–4 carbon atoms optionally substituted by sulfo, sulfo, carboxy, hydroxy, cyano, carbamoyl, sulfamoyl, carboxylate ester, 2-hydroxyethylsulfonyl, amino, acylamino having 1–4 carbon atoms and amino substituted with one or two alkyl groups having 1–4 carbon atoms. Specific examples of such phenyl represented by $R^7$, $R^8$, $R^9$ and $R^{10}$ include phenyl, 2-methylphenyl, 3-methylphenyl, 4-methylphenyl, 2-methoxyphenyl, 3-methoxyphenyl, 4-methoxyphenyl. 2-ethylphenyl, 3-ethylphenyl, 4-ethylphenyl, 2-ethoxyphenyl, 3-ethoxyphenyl, 4-ethoxyphenyl, 2-carboxyphenyl, 3-carboxyphenyl, 4-carboxyphenyl, 2-chlorophenyl, 3-chlorophenyl, 4-chlorophenyl, 2-sulfophenyl, 3-sulfophenyl, 4-sulfophenyl, 3-sulfo-4-methoxyphenyl, 2-hydroxyphenyl, 3-hydroxyphenyl and 4-hydroxyphenyl.

Preferred examples are 2-methylphenyl, 3-methylphenyl, 4-methylphenyl, 2-ethylphenyl, 3 -ethylphenyl, 4-ethylphenyl, 2-chlorophenyl, 3-chlorophenyl and 4-chlorophenyl.

Examples of naphthyl represented by $R^7$, $R^8$, $R^9$ and $R^1$ in the formulae (X1), (X3) and (X4) include unsubstituted naphthyl and naphtyl substituted with one, two or three substituents selected from the group consisting of halogeno such as chloro and bromo, alkyl having 1–4 carbon atoms, alkoxy having 1–4 carbon atoms, sulfo, carboxy and hydroxy.

More specific examples of the naphthyl represented by $R^7$, $R^8$, $R^9$ and $R^{10}$ include 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-4,7-, 3,8-, 4,6-, 3,7- or 3,6-disulfo-2-naphthyl, 4,6,8-, 2,4,7- or 3,6,8-trisulfo-1-naphthyl, 4,6,8- or 3,6,8-trisulfo-2-naphthyl.

Preferred examples are 2-, 3-, 4-, 5-, 6-, 7- or 8-sulfo-1-naphthyl and 1-, 5-, 6-, 7- or 8-sulfo-2-naphthyl.

The monoazo compound represented by the formula (I) wherein $X^1$ and/or $X^2$ is a group of formula (X1), i.e. a group —NR$^7$R$^8$, can be produced by a reaction with an amine compound of formula (HNR$^7$R$^8$). Examples of the amine compound of formula (HNR$^7$R$^8$) include ammonia;

aromatic amines such as aminobenzene (aniline), 1-amino-2-, -3-, or -4-methylbenzene, 1-amino-2,4-, -3,4-, or -3,5-dimethylbenzene, 1-amino-2-, -3-, or -4-ethylbenzene, 1-amino-2-, -3-, or -4-methoxybenzene, 1-amino-2-, -3-, or -4-ethoxybenzene, 1-amino-2-, -3-, or -4-chlorobenzene, 1 -amino-2-, -3-, or -4-bromobenzene, 1 -amino-2-, -3-, or -4-fluorobenzene, 3-or 4-aminophenyl-methanesulfonic acid, 2-, 3- or 4-aminobenzenesulfonic acid, 3- or 4-methylaminobenzene-sulfonic acid, 3- or 4-ethylamino-benzenesulfonic acid, 5-aminobenzene- 1,3-disulfonic acid, 6-aminobenzene-1,3- or -1,4-disulfonic acid, 4-aminobenzene-1,2-disulfonic acid, 4-amino-5-methylbenzene- 1 ,2-disulfonic acid, 2-, 3- or 4-aminobenzoic acid, 5-aminobenzene-1,3-dicarboxylic acid, 5-amino-2-hydroxy-benzenesulfonic acid, 4-amino-2-hydroxy-benzenesulfonic acid, 5-amino-2-ethoxy-benzenesulfonic acid, N-methylaminobenzene, N-ethylaminobenzene, 1-methylamino-3- or -4-methylbenzene, 1-ethylamino-3- or -4-methylbenzene, 1-methylamino-2-, -3- or -4-chlorobenzene, 1-ethylamino-2-, -3- or -4-chlorobenzene, 1-(2-hydroxyethyl)amino-3-methylbenzene, 3- or 4-methylaminobenzoic acid, 1-amino-2-methoxy-5-methylbenzene, 1-amino-2,5-dimethoxybenzene, 2-, 3- or 4-aminophenol, 1-amino-3- or -4-acetylaminobenzene, 2,4- or 2,5-diaminobenzenesulfonic acid, 1-aminobenzene-3- or -4-(β-hydroxyethylsulfone), 2-, 4-, 5-, 6-, 7-or 8-aminonaphthalene-1-sulfonic acid, 1-, 4-, 5-, 6-, 7- or 8-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 4-, 5-, 6-, 7- or 8-aminonaphthalene-1,3-disulfonic acid, 2-, 3- or 4-aminonaphthalene-1,5-disulfonic acid, 4- or 8-aminonaphthalene-1, 6-disulfonic acid, 4-aminonaphthalene-1,7-disulfonic acid, 3-or 4-aminonaphthalene-2,6-disulfonic acid, 3- or 4-aminonaphthalene-2,7-disulfonic acid, 6- or 7-aminonaphthalene-1,3,5-trisulfonic acid, 4-, 7- or 8-aminonaphthalene-1,3,6-trisulfonic acid and 4-aminonaphthalene-1,3,7-trisulfonic acid; and aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis(2-hydroxyethyl)amine, 2-acetylaminoethylamine, 1-amino-2-propanol, 3-methoxypropylamine, 1-amino-3-dimethylaminopropane, 2-aminoethanesulfonamide, 2-aminoethanesulfonic acid, aminomethanesulfonic acid, 2-methylaminoethanesulfonamide, 2-methylaminoethanesulfonic acid, 3-amino-1-propanesulfonic acid, 2-sulfatoethylamine, aminoacetic acid, methylaminoacetic acid, 3-aminopropionic acid, 3-aminopropionamide, 3-methylaminopropionic acid, 3-methylamino-propionamide, ε-aminocaproic acid, benzylamine, 2-, 3 - or 4-sulfobenzylamine, 2-, 3- or 4-chlorobenzylamine, 2-, 3- or 4-methylbenzylamine, N-methylbenzylamine, 1-phenylethylamine, 2-phenylethylamine and 1-phenyl-2-propylamine.

Among the amine compounds of the formula: $HNR^7R^8$, preferred compounds include, for example, aniline, N-methylaniline, N-ethylaniline, 2-, 3- or 4-chloroaniline, N-methyl-2-, -3-or -4-chloroaniline, N-ethyl-2-, -3- or -4-chloroaniline, 2-, 3-or 4-methylaniline, 2-, 3- or 4-ethylaniline, 2-, 3- or 4- methoxyaniline, 2-, 3- or 4-ethoxyaniline, 2-, 3- or 4-hydroxyaniline, aniline-2-, -3- or -4-sulfonic acid, 3- or 4-methylaminobenzenesulfonic acid, 3- or 4-ethylaminobenzene-sulfonic acid, 2-, 3- or 4-carboxyaniline, ammonia, methylamine, ethylamine, dimethylamine, taurine, N-methyltaurine, mono- or di-ethanolamine, 2-sulfamoylethylamine and 2-carbamoylethylamine.

It is more preferred that one of groups represented by $R^7$ and $R^8$ in the amine compounds of the formula: $HNR^7R^8$ is phenyl which may be optionally substituted. Further more preferably, $R^7$ is hydrogen, methyl or ethyl and $R^8$ is unsubstituted phenyl or phenyl substituted with a substitutent selected from the group consisting of alkyl having 1–4 carbon atoms, alkoxy having 1–4 carbon atoms, sulfo, carboxy, halogeno, hydroxy, cyano and acylamino having 1–4 carbon atoms.

Particularly preferred compounds in the amine compounds of the formula: $HNR^7R^8$ are aniline, N-methylaniline, N-ethylaniline, 2-, 3- or 4-chloroaniline, N-methyl-2-, -3- or -4-chloroaniline, N-ethyl-2-, -3- or -4-chloroaniline, 2-, 3- or 4-methylaniline, 2-, 3- or 4-ethylaniline, 2-, 3- or 4-methoxyaniline, 2-, 3- or 4-ethoxyaniline, 2-, 3-, or 4-hydroxyanaline, aniline-2-, -3- or -4-sulfonic acid, 3- or 4-methylaminobenzenesulfonic acid, 3- or 4-ethylaminobenzene-sulfonic acid and 2-, 3- or 4-carboxyaniline.

The monoazo compound represented by the formula (I) wherein $X^1$ and/or $X^2$ is a group of formula (X3), i.e. a group $—OR^9$, can be produced by a reaction with a compound of formula $(HOR^9)$. Examples of the compound of formula $(HOR^9)$ include phenols such as phenol, 1-hydroxy-2-, -3- or -4-methylbenzene, 1 -hydroxy-3,4- or -3,5-dimethylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3- or 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene- 1,3-dicarboxylic acid and 5-hydroxy-2-ethoxybenzenesulfonic acid; naphthols such as 2-, 4-, 5-, 6-, 7- or 8-hydroxynaphthalene-1-sulfonic acid, 1-, 4-, 5-, 6-, 7- or 8-hydroxynaphthalene-2-sulfonic acid, 4-, 5-, 6-, 7- or 8-hydroxynaphthalene-1,3-disulfonic acid, 2-, 3- or 4-hydroxynaphthalene-1,5-disulfonic acid, 4- or 8-hydroxynaphthalene-1,6-disulfonic acid, 4-hydroxynaphthalene-1,7-disulfonic acid, 3- or 4-hydroxynaphthalene-2,6-disulfonic acid, 3- or 4-hydroxynaphthalene-2,7-disulfonic acid, 6- or 7-hydroxynaphthalene-1,3,5-trisulfonic acid, 4-, 7- or 8-hydroxynaphthalene-1,3,6-trisulfonic acid and 4-hydroxynaphthalene-1,3,7-trisulfonic acid; and aliphatic alcohols such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfatoethanol, glycolic acid, 3-hydroxypropionic acid, benzyl alcohol, 2-, 3- or 4-chlorobenzylalcohol, 4-methylbenzylalcohol, 2-, 3- or 4-sulfobenzylalcohol, 2-phenylethanol and 1-phenyl-2-propanol.

The monoazo compound represented by the formula(I) wherein $X^1$ and/or $X^2$ is a group of formula (X4), i.e. group of $SR^{10}$, can be produced by a reaction with a compound of formula $(HSR^{10})$. Examples of the compound of formula $(HSR^{10})$ include compounds formed by replacing the hydroxy groups in the phenols, naphthols and aliphatic alcohols as exemplified for the compounds to form the compound of general formula (X3) with mercapto groups.

In the monoazo compound of the formula (I), at least one of $X^1$ and $X^2$ is pyridinio which may be optionally substituted or a group of the formula (X1), (X2), (X3) or (X4).

It is preferred that at least one of $X^1$ and $X^2$ is a group represented by the formula (X1). Particularly, itispreferredthat, in the general formula (X1), $R^7$ is hydrogen, methyl or ethyl and $R^8$ is phenyl which may be optionally substituted with a substituent selected from the group consisting of alkyl having 1–4 carbon atoms, alkoxy having 1–4 carbon atoms, sulfo, carboxy, halogeno, hydroxy, cyano and acylamino.

The monoazo compound of the formula (I) of the present invention may exist in the free acid form, in the salt form or a mixture thereof. Preferred form is alkali metal salts, alkaline earth metal salts and a mixture containing them.

Particularly, sodium salt, potassium salt, lithium salt and a mixture containing them are preferred.

The monoazo compound of the present invention is not particularly limited insofar as it is encompassed in the general formula (I). Preferred examples of the monoazo compounds include those shown below:

atom, methyl or ethyl, $R^4$ is a hydrogen atom, $R^8$ is unsubstituted phenyl or phenyl substituted with a substituent selected from the group consisting of alkyl having 1–4 carbon atoms, alkoxy having 1–4 carbon atoms, sulfo, carboxy, halogeno, hydroxy, cyano and acylamino, $A^1$ is unsubstituted phenylene or phenylene substituted with one

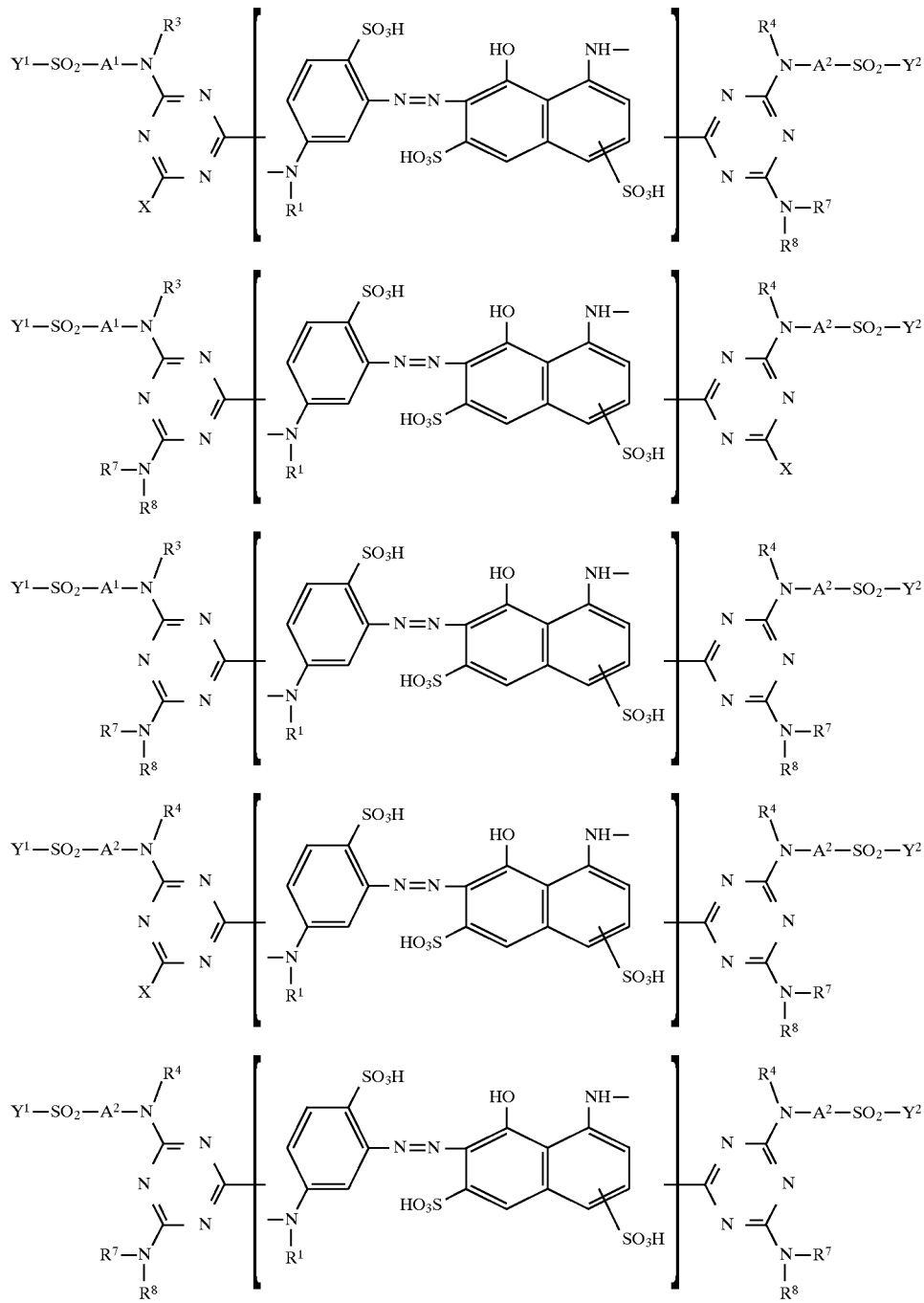

Wherein $R^1, R^3, R^4, R^7, R^8, A^1, A^2, Y^1$ and $Y^2$ are as defined above; X represents fluorine, chlorine or bromine; and [ ] indicates that two triazine rings shown on both sides thereof may be attached to any one of the two amino groups in the structure shown in [ ].

Particularly, it is preferred that $R^1$, $R^3$, and $R^7$, which are the same as or different from each other, are a hydrogen or two groups selected from methyl and methoxy, $A^2$ is ethylene or trimethylene and X is fluorine or chlorine.

A process for producing the monoazo compound of formula (I) of the present invention is not particularly limited and such compound can be produced by the following process.

For the monoazo compound of the formula (I) wherein $X^1$ is halogeno and $X^2$ is pyridinio which may be optionally substituted or a group of the above described general formula (X1), (X2), (X3) or (X4), the following three processes, Process I, II and III, can be applied.

Process I

A compound represented, in the free acid form, by the following general formula (IV):

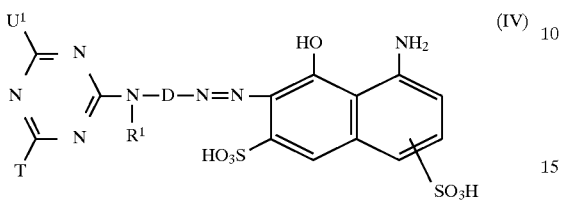

wherein D, $R^1$ and $U^1$ are as defined above and T represents halogeno, an amine compound representedbythe following general formula (V-1), (V-2) or (V-3):

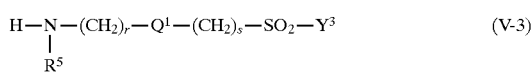

wherein $A^1$, $A^2$, $Q^1$, $R^3$, $R^4$, $R^5$, $Y^1$, $Y^2$, $Y^3$, r and s are as defined above, and a compound represented by the following general formula (VI-1), (VI-2), (VI-3), (VI-4) or (VII):

wherein $R^7$, $R^8$, $R^9$, $R^{10}$, $Q^2$ and t are as defined above; and $(R')_u$ represents the optional substituents on the pyridinio group represented by $X^1$ and $X^2$ in the definition of formula (I), for example R' represents a hydrogen atom, carboxy, carbamoyl, sulfo, halogeno or alkyl having 1–4 carbon atoms which may be optionally substituted and u represents 1or 2, are condensed with 2,4,6-trihalogeno-s-triazine in any optional order.

In the general formula (IV), specific examples of halogeno represented by T include halogeno similar to those exemplified for $X^1$ and $X^2$.

The compound of the general formula (IV) as the starting compound can be obtained in the following manner:

A compound represented by the following general formula (VIII):

wherein $R^1$ and D are as defined above, and an amine compound represented by the formula (V-1), (V-2) or (V-3) are condensed with 2,4,6-trihalogeno-s-triazine in any optional order to give an amine compound of the formula (IX):

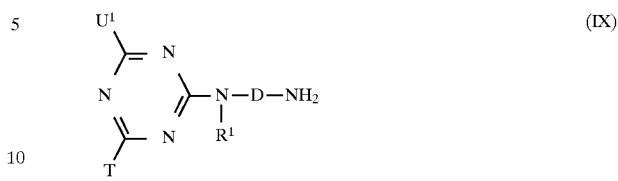

wherein D, $R^1$ and $U^1$ are as defined above and T represents halogeno, then this compound is diazotized in the conventional way and the obtained compound is coupled with a compound represented, in the free acid form, by the following general formula (X):

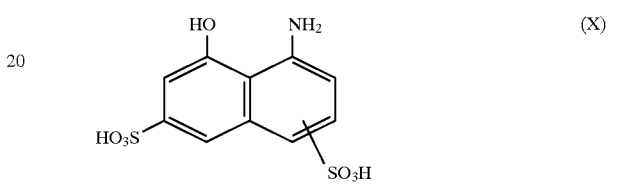

in neutral to weakly alkaline conditions to give the compound of the general formula (IV).

The compound of the general formula (IV) as the starting compound can also be synthesized in the following manner:

An amine compound represented by the following general formula (XI):

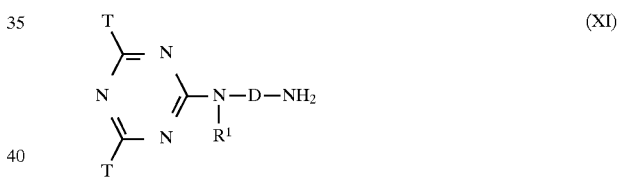

wherein $R^1$, D and T are as defined above, is diazotized in the conventional way and then the obtained compound is coupled with the compound represented by the above described formula (X) in neutral to weakly alkaline conditions to give a compound of the following general formula (XII):

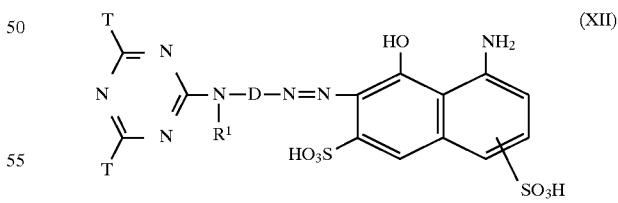

wherein $R^1$ and D are as defined above and T represents halogeno, then this compound is condensed with the amine compound represented by the above described formula (V-1), (V-2) or (V-3) to give the compound of the general formula (IV).

Process II

A monoazo compound represented, in the free acid form, by the following general formula (XIII):

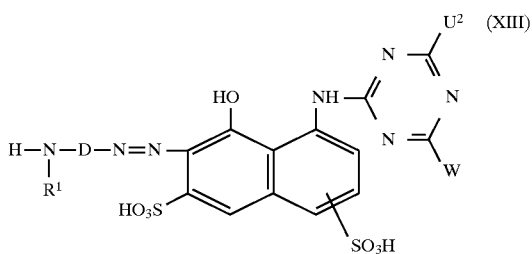

wherein D, R¹ and U² are as defined above; W is pyridinio which may be optionally substituted or a group of the above described general formula (X1), (X2), (X3) or (X4), and an amine compound represented by the above described formula (V-1), (V-2) or (V-3) are condensed with 2,4,6-trihalogeno-s-triazine in any optional order.

The compound of the formula (XIII) as the starting compound can be produced in the following manner:

An amine compound represented by the above described formula (VIII) is diazotized and the obtained diazo compound is coupled with the compound represented by the formula (X). Then, the obtained compound, the amine compound represented by the above described formula (V-1), (V-2) or (V-3) and a compound represented by the above described formula (VI-1), (VI-2), (VI-3), (VI-4) or (VII) are condensed with 2,4,6-trihalogeno-s-triazine in any optional order to give the monoazo compound represented by the general formula (XIII).

Process III

An amine compound represented by the above described formula (IX) is diazotized, and the product is coupled with a compound represented, in the free acid form, by the following general formula (XIV):

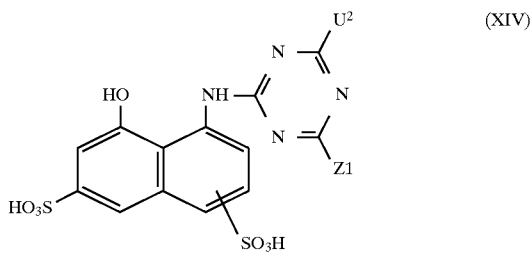

wherein U² is as defined above; Z1 is pyridinio which may be optionally substituted or a group of the above described formula (X1), (X2), (X3) or (X4), in weakly acidic to weakly alkaline conditions to give the compound of the general formula (I).

In the general formula (XIV), specific examples of group represented by Z1 include pyridinio groups similar to those exemplified for X¹ and X².

The compound of the general formula (XIV) as the starting compound can be produced by condensing a compound represented by the above described formula (X), an amine compound represented by the above described general formula (V-1), (V-2) or (V-3) and a compound represented by the above described general formula (VI-1), (VI-2), (VI-3), (VI-4) or (VII) with 2,4,6-trihalogeno-s-triazine in any optional order.

The monoazo compound of the formula (I) wherein X¹, is pyridinio which may be optionally substituted or a group of the above described formula (X1), (X2), (X3) or (X4) and X² is halogeno can be obtained by analogous process resulting from the adaptation of Process I, II or III described above.

Further, the monoazo compound of the formula (I) wherein X¹ and X², which are the same as or different from each other, each represent pyridinio which may be optionally substituted or a group of the above described general formula (X1), (X2), (X3) or (X4) can be obtained, for example, by the following three processes, Process IV, V or VI.

Process IV

A monoazo compound of the formula (I) wherein X¹ is halogeno and X² is pyridinio which may be optionally substituted or a group of the above described general formula (X1), (X2), (X3) or (X4), or a monoazo compound of the formula (I) wherein X¹ is pyridinio which may be optionally substituted or a group of the above described general formula (X1), (X2), (X3) or (X4) and X² is halogeno is condensed with a compound represented by the above described general formula (VI-1), (VI-2), (VI-3), (VI-4) or (VII).

Process V

A compound represented, in the free acid form, by the following general formula (XV):

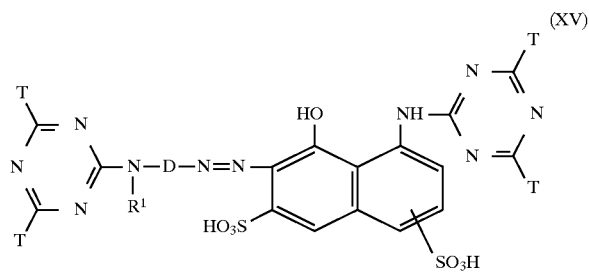

wherein D and R¹ are as defined above; and T represents halogen, is condensed with a compound represented by the above described formula (V-1), (V-2) or (V-3) and a compound represented by the above described general formula (VI-1), (VI-2), (VI-3), (VI-4) or (VII) in any optional order. In this reaction, it is preferred that the amounts of the two compounds to be condensed are 2 equivalents or more, respectively, with regard to the compound represented by the formula (XV). This process is suitable for the production of a monoazo compound of the formula (I) wherein U¹ and U² are the same group and X¹ and X² are the same group.

The compound of the general formula (XV) as the starting compound can be produced, for example, by diazotizing a compound represented by the above described formula (XI), and coupling the diazotized product with a compound represented, in the free acid form, by the following general formula (XVI):

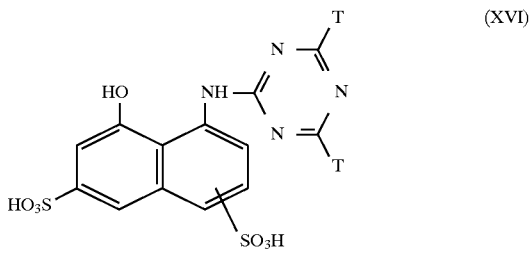

wherein T represents halogen, in weakly acidic to weakly alkaline conditions.

Alternatively, the compound represented by the above described formula (XV) can be produced by condensing a compound represented, in the free acid form, by the following general formula (XVII):

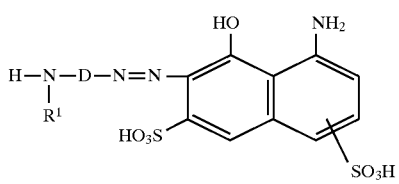

wherein D and $R^1$ are as defined above, with 2,4,6-trihalogeno-s-triazine. In this reaction, it is preferred that the amount of 2,4,6-trihalogeno-s-triazine is 2 equivalents or more with regard to the compound represented by the formula (XVII).

Process VI

This process is suitable for producing the monoazo compound of the formula (I) wherein $U^1$ and $U^2$ are the same group and $X^1$ and $X^2$ are the same group.

A compound represented by the following general formula (XVIII):

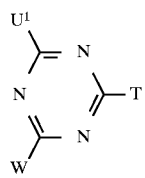

wherein $U^1$, T and W are as defined above, is condensed with the compound represented by the above described formula (XVII).

In this reaction, it is preferred that the amount of the compound represented by the general formula (XVIII) is 2 equivalents or more with regard to the compound represented by the general formula (XVII).

Specific examples of 2,4,6-trihalogeno-s-triazine used in obtaining the monoazo compound of the formula (I) or the starting compound therefor include cyanuric chloride and cyanuric fluoride.

In the condensation reaction with 2,4,6-trihalogeno-s-triazine, the order of condensation is not particularly limited as described above. Also, the conditions for condensation reaction are not particularly limited and following conditions can be mentioned as an example. The first condensation reaction, i.e. the condensation reaction of trihalogeno-s-triazine, can be carried out at a temperature of –10° C. to 40° C. and pH of 1 to 10. The second condensation reaction, i.e. the condensation reaction of dihalogeno-s-triazine, can be carried out at a temperature of 0° C. to 70° C. and pH of 2 to 10. The third condensation reaction, i.e. the condensation reaction of monohalogeno-s-triazine, can be carried out at a temperature of 10° C. to 100° C. and pH of 2 to 9.

For obtaining the monoazo compound of the formula (I) in which $Y^1$, $Y^2$ or $Y^3$ in (U 1), (U2) or (U3) is —$CH_2CH_2Z$ wherein the group Z is an ester group such as sulfate ester and phosphate ester, an amine compound of the following general formula (V-1a), (V-2a) or (V-3a):

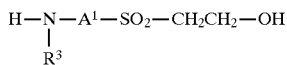

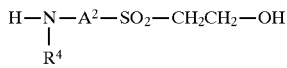

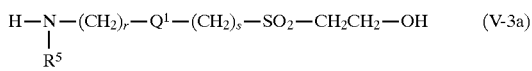

wherein $A^1$, $A^2$, $Q^1$, $R^3$, $R^4$, $R^5$, r and s are as defined above, can be used in the process described above in place of the compound of the general formula (V-1), (V-2) or (V-3), to give a precursor of the monoazo compound of the formula (I), which is then esterified in conventional manner to give the compound of the general formula (I), in other words, to form the ester group after the condensation reaction.

The compounds of the present invention can be used as a dye for dyeing or printing a material, particularly a fiber material. Such material is not particularly limited insofar as it contains a hydroxyl group and/or carbonamido group and includes, for example, natural or regenerated cellulose fibers, natural or synthetic polyamide fibers, polyurethane fibers, leather and textile blend materials containing them.

The natural cellulose fibers include specifically cotton, linen, flax, jute and ramie fibers. Preferred one is cotton.

Regenerated cellulose fibers include specifically rayon, polynosic, cupra, "Tencel", "Tufcel", "Modal" and "Celtima" in tradenames.

The natural or synthetic polyamide fibers include specifically wool, silk, polyamide-6,6, polyamide-6, polyamide-11 and polyamide-4.

The textile blend materials containing them include textile blend materials consisting of these fiber materials, and textile blend materials comprising the fiber material and a synthetic fiber such as polyester, Nylon and acryl fiber.

The compounds of the present invention can be used for dyeing or printing the above-described materials, particularly fiber materials, by a method suited to physical properties of individual material.

Specifically, such method includes, for example, exhaustion dyeing, cold batch-up process, continuous dyeing and printing.

When a cellulose fiber material is dyed by exhaustion dyeing, the dyeing can be carried out at a temperature of about 30°–100° C. in the presence of an acid binding agent such as sodium carbonate, trisodium phosphate, sodium hydrogen carbonate and sodium hydroxide and, if necessary, with addition of a neutral salt such as sodium sulfate or sodium chloride, as well as dissolution aid, penetrating agent or levelling agent. The acid binding agent, neutral salt or the like can be added in one portion or in divided portions according to the conventional manner.

When a cellulose fiber material is dyed by the cold batch-up process, the fiber can be treated, for example, by padding it with a neutral salt such as sodium sulfate and sodium chloride and acid binding agent such as sodium hydroxide and sodium silicate, and then allowing to stand in a sealed packing material at a predetermined temperature.

When a cellulose fiber is dyed by the continuous dyeing process, the process can be carried out, for example, by the all-in padding method in which the fiber is padded according to the conventional manner in the presence of an acid binding agent such as sodium carbonate and sodium hydrogen carbonate at room temperature or at an elevated temperature, and then the fiber is subjected to steaming or dry-heating, or by the two-phase padding process in which the fiber is dipped in a padding solution in which the monoazo compound of the present invention is dissolved, and then the fiber is padded with a neutral salt such as sodium sulfate and sodium chloride and acid binding agent such as sodium hydroxide and sodium silicate, followed by steaming or dry-heating.

When a cellulose fiber is printed, the printing can be carried out by the all-in method in which the fiber is printed with a printing paste containing an acid binding agent, such as sodium hydrogen carbonate, and, then, the fiber is subjected to steaming at a high temperature of 80° C. or above, or by the two-phase process in which the fiber is printed with, for example, a neutral or weakly acidic printing paste and, then, passed through an electrolyte-containing alkaline bath, or over-padded with an alkaline electrolyte-containing padding solution, followed by steaming or dry-heating. The printing paste may contain a size such as sodium alginate and starch ether and/or a emulsifier together with, if necessary, a conventional printing aid such as urea and/or a dispersing agent.

When the monoazo compound of the present invention is dyed or printed on cellulose fibers, usable acid binding agent is not particularly limited and may be, for example, above described sodium carbonate, sodium hydrogen carbonate, trisodium phosphate, sodium hydroxide, or sodium silicate as well as, for example, potassium hydroxide, sodium formate, potassium carbonate, mono-, di- or tri-sodium phosphate, sodium trichloroacetate or the like.

When a synethetic or natural polyamide fiber or a urethane fiber is dyed by exhaustion dyeing, the dying can be carried out, for example, by exhausting the monoazo compound of the present invention in an acidic or weakly acidic dye bath under controlling of pH, followed by changing pH to a neutral to alkaline region at a temperature of about 60° C.–120° C. If necessary, a levelling agent, such as a condensation product of cyanuric chloride and aminobenzene sulfonic acid, a condensation produce of cyanuric chloride and aminonaphthalene sulfonic acid and an addition product of stearyl amine and ethylene oxide, can be used.

The monoazo compounds of the present invention can be used, if necessary, for obtaining, a desired color by mixing with other dyes insofar as the advantageous nature of the present invention is not damaged. Said other dyes for mixing may be any reactive dyes and are not particularly limited. Examples of the reactive dyes include those having one or more groups selected from sulfatoethylsulfone group, vinylsulfone group, monochlorotriazine group, monofluorotriazine group, mononicotinic acid triazine group, dichlorotriazine group, difluoromonochloropyrimidine group and trichloropyrimidine group; those commercialized, for example, under tradenames of Sumifix, Sumifix Supra, Remazol, Levafix, Procion, Cibacron, Basilen, Drimarene, Kayacion, Kayacelon React, etc.; and further dyes described in JP-A-50-178, JP-A-51-17538, JP-A-56-9483, JP-A-56-15481, JP-A-56-118976, JP-A-56-128380, JP-A-57-2365, JP-A-57-89679, JP-A-57-143360, JP-A-58-191755, JP-A-59-15451, JP-A-59-96174, JP-A-59-161463, JP-A-60-6754, JP-A-123559, JP-A-60-229957, JP-A-60-260654, JP-A-61-126175, JP-A-61-155469, JP-A-61-225256, JP-A-63-77974, JP-A-63-225664, JP-A-1-185370, JP-A-3-770, JP-A-5-247366 and JP-A-6-287463.

When the monoazo compounds of the present invention are used for dyeing and printing of fiber materials, they are excellent in reproducibility, having a good levelness, have a high build-up property, have a high effective exhaustion ratio, are capable of dyeing at a low salt concentration and capable of giving dyed or printed product excellent in various fastness, particularly in chlorine resistance, light resistance, perspiration resistance, perspiration-sunlight resistance, hydrolysis resistance and alkali resistance.

EXAMPLES

The present invention will now be illustrated in more detail by means of Examples, which should not be construed as limitation upon the scope of the invention. In the Examples, parts means parts by weight.

Example 1

At a pH of 2–4 and a temperature of 0°–15° C., 18.8 parts of 2,4-diaminobenzenesulfonic acid and 18.4 parts of cyanuric chloride were condensed, and then, 28.1 parts of 3-(2-sulfatoethylsulfonyl)aniline was condensed therewith at a pH of 4–8 and a temperature of 10–40° C. The obtained compound was diazotized according to the conventional method to obtain a diazotization product. Separately, 31.9 parts of 1-amino-8-hydroxynaphthalene-3,6-disulfonic acid was condensed with 18.4 parts of cyanuric chloride at a temperature of 0°–15° C. and a pH of 1–3. Then, 23.3 parts of 2-(2-sulfatoethylsulfonyl)ethylamine was condensed therewith at a pH of 4–8 and a temperature of 0°–40° C. Further, 9.3 parts of aniline was condensed with the condensed product at a pH of 2–6 and a temperature of 30°–70° C. The obtained product was coupled with the diazotization product obtained above at a pH of 3–8 and a temperature of 0°–20° C. Then, the product was salted out to give a monoazo compound represented, in the free acid form, by the following formula:

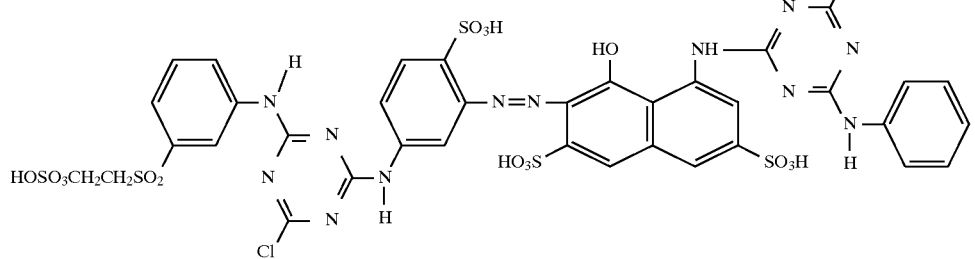
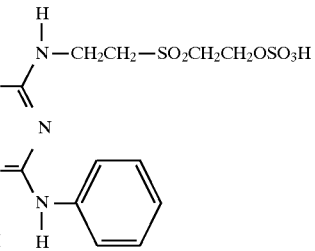

(wave length of the maximum absorption: $\lambda_{max}$=550 nm, in an aqueous medium)

Example 2

Using compounds shown in column 2, column 3, column 4, column 5 and column 6, in this order, of the following Tables 1–4 in place of 3-(2-sulfatoethylsulfonyl)aniline, 2,4-diaminobenzenesulfonic acid, 1-amino-8-hydroxynaphthalene-3,6-disulfonic acid, 2-(2-sulfatoethylsulfonyl)ethylamine and aniline used in Example 1, corresponding monoazo compounds were synethesized in a manner similar to that in Example 1. Using the monoazo compounds thus obtained, dyeing was conducted and dyed products having respective colors shown in column 7 of the Tables 1–4 were obtained.

The same compounds were obtained even when the order of the first condensation, the second condensation and the third condensation of the compounds shown in column 2, column 3, column 4, column 5 and column 6 of Tables 1–4 to cyanuric chloride in the above syntheses was exchanged.

Also, the same compounds were obtained when syntheses were carried out in the same manner as in the above described syntheses except for using the corresponding hydroxyethylsulfonyl compounds in place of compounds in column 2 and column 5 of the Tables 1–4 and then sulfating the product in a conventional manner in the last step.

TABLE 1

| 1 | 2 | 3 | 4 | 5 | 6 | 7 |
|---|---|---|---|---|---|---|
| 1 | HOSO₃C₂H₄SO₂—⌬—NH₂ | ⌬ with SO₃H, NH₂, H₂N | naphthalene with NH₂, OH, two SO₃H | H₂NC₂H₄SO₂C₂H₄OSO₃H | H₂N—⌬—SO₃H | Red |
| 2 | ← | ← | ← | ⌬ with H₂N and SO₂C₂H₄OSO₃H | H₂N—⌬—SO₂C₂H₄OSO₃H | ← |
| 3 | HOSO₃C₂H₄SO₂C₂H₄NH₂ | ← | ← | ← | ← | ← |
| 4 | ← | ← | ← | ← | ⌬ with H₂N and C₂H₅ | ← |
| 5 | HOSO₃C₂H₄SO₂—⌬—NH₂ | ← | ← | H₂NC₃H₆SO₂C₂H₄OSO₃H | ⌬ with HN—CH₃ | ← |

TABLE 2

| 1 | 2 | 3 | 4 | 5 | 6 | 7 |
|---|---|---|---|---|---|---|
| 6 | ![H$_2$N-C$_6$H$_4$-SO$_2$C$_2$H$_4$OSO$_3$H (meta)] HOSO$_3$C$_2$H$_4$SO$_2$- (m-aniline) | H$_2$N, SO$_3$H, NH$_2$ (2,4-diaminobenzenesulfonic acid) | HO, NH$_2$, SO$_3$H, HO$_3$S (aminonaphthol disulfonic acid) | H$_2$NC$_2$H$_4$SO$_2$CH=CH$_2$ | H$_2$N-C$_6$H$_5$ (aniline) | Red |
| 7 | HOSO$_3$C$_2$H$_4$SO$_2$C$_2$H$_4$NH$_2$ | ← | ← | H$_2$NC$_2$H$_4$SO$_2$C$_2$H$_4$OSO$_3$H | H$_2$N-C$_6$H$_4$-OH | ← |
| 8 | HOSO$_3$C$_2$H$_4$SO$_2$C$_3$H$_6$NH$_2$ | ← | ← | H$_2$N-C$_6$H$_4$-SO$_2$C$_2$H$_4$OSO$_3$H | H$_2$N-C$_6$H$_4$-Cl | ← |
| 9 | ![m-aniline] HOSO$_3$C$_2$H$_4$SO$_2$- | ← | ← | H$_2$NC$_2$H$_4$SO$_2$C$_2$H$_4$OSO$_3$H | ← | ← |
| 10 | ![p-aniline] CH$_2$=CHSO$_2$- | ← | ← | ← | H$_2$N-C$_6$H$_4$-SO$_3$H | ← |

TABLE 3

| 1 | 2 | 3 | 4 | 5 | 6 | 7 |
|---|---|---|---|---|---|---|
| 11 | HOSO$_3$C$_2$H$_4$SO$_2$- (3-aminophenyl) | (2,4-diaminobenzenesulfonic acid) | (1-amino-8-hydroxy-naphthalene-3,6-disulfonic acid with NH$_2$ at 4) | H$_2$NC$_2$H$_4$SO$_2$C$_2$H$_4$OSO$_3$H | aniline (H$_2$N–C$_6$H$_5$) | Red |
| 12 | HOSO$_3$C$_2$H$_4$SO$_2$C$_2$H$_4$NH$_2$ | ← | ← | H$_2$NC$_2$H$_4$OC$_2$H$_4$SO$_2$–C$_2$H$_4$OSO$_3$H | 4-ethylaniline | ← |
| 13 | ← | (2,5-diaminobenzenesulfonic acid) | (1-amino-8-hydroxynaphthalene-3,6-disulfonic acid; H-acid) | ← | 3-aminobenzoic acid | ← |
| 14 | ← | (1-amino-5-methylamino-naphthalene-sulfonic acid) | ← | (3-aminophenyl)-SO$_2$C$_2$H$_4$OSO$_3$H | 3-aminobenzenesulfonic acid | ← |
| 15 | ← | ← | (4-amino-5-hydroxy-naphthalene-2,7-disulfonic acid type) | (4-aminophenyl)-SO$_2$CH=CH$_2$ | ← | ← |

TABLE 4

| 1 | 2 | 3 | 4 | 5 | 6 | 7 |
|---|---|---|---|---|---|---|
| 16 | HOSO₃C₂H₄SO₂C₂H₄NH₂ | diaminobenzene sulfonic acid | amino-hydroxy-naphthalene disulfonic acid | 3-aminophenyl β-sulfatoethyl sulfone (SO₂C₂H₄OSO₃H) | H₂NC₂H₄SO₃H | Red |
| 17 | ← | ← | ← | ← | morpholine | ← |
| 18 | ← | ← | ← | ← | nicotinic acid (CO₂H-pyridine) | ← |
| 19 | HOSO₃C₂H₄SO₂- (3-aminophenyl) | amino-naphthalene sulfonic acid (diamino) | ← | H₂NC₃H₆SO₂C₂H₄OSO₃H | ← | ← |
| 20 | HOSO₃C₂H₄SO₂C₂H₄NH₂ | ← | ← | ← | phenol (HO-C₆H₅) | ← |

Example 3

At a pH of 2–4 and a temperature of 0°–15° C., 18.8 parts of 2,4-diaminobenzenesulfonic acid and 18.4 parts of cyanuric chloride were condensed, and then, 28.1 parts of 3-(2-sulfatoethylsulfonyl)aniline was condensed therewith at a pH of 4 -8 and a temperature of 10°–40° C. To the reaction products, 9.3 parts of aniline was condensed at a pH of 2–6 and a temperature of 30°–70° C. The obtained compound was diazotized according to the conventional method to obtain a diazotization product.

Separately, 31.9 parts of 1-amino-8-hydroxynaphthalene-3,6-disulfonic acid was condensed with 18.4 parts of cyanuric chloride at a temperature of 0°–15° C. and pH of 1–3. Then, 23.3 parts of 2-(2-sulfatoethylsulfonyl)-ethylamine was condensed therewith at a pH of 4–8 and a temperature of 0°–40° C. The obtained product was coupled with the diazotization product obtained above at a pH of 3–8 and a temperature of 0°–20° C. Then, the product was salted out to give a monoazo compound represented, in the free acid form, by the following formula:

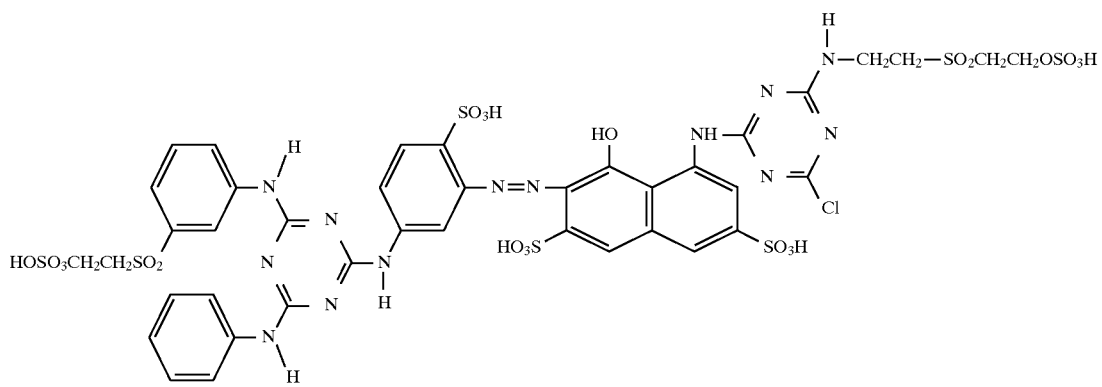

(wave length of the maximum absorption: $\lambda_{max}$=550 nm, in an aqueous medium)

Example 4

Using compounds shown in column 2, column 3, column 4, column 5 and column 6, in this order, of the following Tables 5–8 in place of 3-(2-sulfatoethylsulfonyl)aniline, aniline, 2,4-diaminobenzenesulfonic acid, 1-amino-8-hydroxynaphthalene-3 ,6-disulfonic acid and 2-(2-sulfatoethylsulfonyl)ethylamine used in Example 3, corresponding monoazo compounds were synthesized in a manner similar to that in Example 3. Using the monoazo compounds thus obtained, dyeing was conducted and dyed products having respective colors shown in column 7 of the Tables 5–8 were obtained.

The same compounds were obtained even when the order of the first condensation, the second condensation and the third condensation of the compounds shown in column 2, column 3, column 4, column 5 and column 6 of Tables 5–8 to cyanuric chloride in the above syntheses was exchanged.

Also, the same compounds were obtained when syntheses were carried out in the same manner as in the above described syntheses except for using the corresponding hydroxyethylsulfonyl compounds in place of compounds in column 2 and column 6 of the Tables 5–8 and then sulfating the product in a conventional manner in the last step.

TABLE 5

| 1 | 2 | 3 | 4 | 5 | 6 | 7 |
|---|---|---|---|---|---|---|
| 1 | HOSO₃C₂H₄SO₂— (4-aminophenyl) | 2-aminobenzenesulfonic acid (NH₂, SO₃H) | 2,4-diaminobenzenesulfonic acid (SO₃H, NH₂, H₂N) | 1-amino-8-hydroxynaphthalene-3,6-disulfonic acid (NH₂, OH, SO₃H, HO₃S) | H₂NC₂H₄SO₂C₂H₄OSO₃H | Red |
| 2 | ← | aniline (NH₂) | ← | ← | 3-aminophenyl-SO₂C₂H₄OSO₃H | ← |
| 3 | HOSO₃C₂H₄SO₂C₂H₄NH₂ | 4-chloro-N-ethylaniline (C₂H₅—NH, Cl) | ← | ← | ← | ← |
| 4 | ← | 3-aminobenzenesulfonic acid (NH₂, HO₃S) | ← | ← | ← | ← |
| 5 | HOSO₃C₂H₄SO₂— (3-aminophenyl) (NH₂) | | ← | ← | H₂NC₃H₆SO₂C₂H₄OSO₃H | ← |

TABLE 6

| 1 | 2 | 3 | 4 | 5 | 6 | 7 |
|---|---|---|---|---|---|---|
| 6 | $HOSO_3C_2H_4SO_2$-[3-aminophenyl] | [aniline] | $SO_3H$/$NH_2$-benzene ($H_2N$-, $SO_3H$-) | 4-amino-5-hydroxy-naphthalene-2,7-disulfonic acid ($NH_2$, $SO_3H$, OH, $HO_3S$) | $H_2NC_2H_4SO_2CH=CH_2$ | Red |
| 7 | $HOSO_3C_2H_4SO_2C_2H_4NH_2$ | | ← | ← | ← | ← |
| 8 | $HOSO_3C_2H_4SO_2C_3H_6NH_2$ | 4-methylaniline ($NH_2$, $CH_3$) | ← | ← | $H_2NC_2H_4SO_2C_2H_4OSO_3H$ | ← |
| 9 | | 4-methoxyaniline ($NH_2$, $CH_3O$) | | | 3-($SO_2C_2H_4OSO_3H$)-aniline ($H_2N$-) | ← |
| 10 | $CH_2=CH_2SO_2$-[4-aminophenyl] ($NH_2$) | 3-aminobenzenesulfonic acid ($NH_2$, $HO_3S$) | ← | ← | 4-($SO_2C_2H_4OSO_3H$)-aniline ($H_2N$-) | ← |
| | | | | | $H_2NC_2H_4SO_2C_2H_4OSO_3H$ | ← |

TABLE 7

| 1 | 2 | 3 | 4 | 5 | 6 | 7 |
|---|---|---|---|---|---|---|
| 11 | H₂NC₂H₄SO₂C₂H₄OSO₃H | aniline (C₆H₅NH₂) | 2,4-diaminobenzenesulfonic acid (H₂N-C₆H₃(SO₃H)-NH₂) | 4-amino-5-hydroxy-naphthalene-2,7-disulfonic acid (H-acid) | 3-aminophenyl β-sulfatoethylsulfone (H₂N-C₆H₄-SO₂C₂H₄OSO₃H) | Red |
| 12 | H₂NC₂H₄OC₂H₄SO₂—C₂H₄OSO₃H | ← | ← | ← | H₂NC₂H₄OC₂H₄SO₂C₂H₄—OSO₃H | ← |
| 13 | HOSO₃C₃H₆SO₂C₂H₄NH₂ | 4-methylaniline (p-toluidine) | 2,5-diaminobenzenesulfonic acid | 8-amino-1-hydroxy-naphthalene-3,6-disulfonic acid | ← | ← |
| 14 | 3-aminophenyl β-sulfatoethylsulfone (HOSO₃C₂H₄SO₂-C₆H₄-NH₂) | 2-aminobenzenesulfonic acid (o-NH₂-C₆H₄-SO₃H) | 1-sulfo-2-amino-5-(aminomethyl)naphthalene | ← | ← | ← |
| 15 | HOSO₃C₂H₄SO₂ (3-substituted phenyl) | N-ethylaniline (C₆H₅NHC₂H₅) | ← | ← | 4-aminophenyl vinylsulfone (H₂N-C₆H₄-SO₂CH=CH₂) | ← |

TABLE 8

| | 1 | 2 | 3 | 4 | 5 | 6 | 7 |
|---|---|---|---|---|---|---|---|
| 16 | | HOSO₃C₂H₄SO₂—C₆H₄—NH₂ (p) | HOC₂H₄NH₂ | 2,4-diaminobenzenesulfonic acid | 8-amino-1-hydroxynaphthalene-3,6-disulfonic acid | H₂NC₂H₄SO₂C₂H₄OSO₃H | Red |
| 17 | | HOSO₃C₂H₄SO₂—C₆H₄—NH₂ (m) | morpholine | ← | ← | ← | ← |
| 18 | | ← | nicotinic acid | ← | ← | 3-aminophenyl-SO₂C₂H₄OSO₃H | ← |
| 19 | | H₂NC₃H₆SO₂C₂H₄OSO₃H | ← | 1-sulfo-2-amino-5-aminomethylnaphthalene | ← | ← | ← |
| 20 | | ← | phenol | ← | ← | H₂NC₂H₄SO₂C₂H₄OSO₃H | ← |

Example 5

At a pH of 2–4 and a temperature of 0°–15° C., 18.8 parts of 2,4-diaminobenzenesulfonic acid and 18.4 parts of cyanuric chloride were condensed, and then, 28.1 parts of 3-(2-sulfatoethylsulfonyl)aniline was condensed therewith at a pH of 4 -8 and a temperature of 10°–40° C. Then, to the reaction product, 9.3 parts of aniline was condensed at a pH of 2–6 and a temperature of 30°–70° C. The obtained compound was diazotized according to the conventional method to obtain a diazotization product.

Separately, 31.9 parts of 1-amino-8 -hydroxynaphthalene-3,6-disulfonic acid was condensed with 18.4 parts of cyanuric chloride at a temperature of 0°–15° C. and pH of 1–3. Then, 23.3 parts of 2-(2-sulfatoethylsulfonyl)-ethylamine was condensed therewith at a pH of 4–8 and a temperature of 0°–40° C. Further, to the reaction product, 17.3 parts of 3-sulfoaniline was condensed at a pH of 2–6 and a temperature of 40°–80° C. The obtained product was coupled with the diazotization product obtained above at a pH of 3–8 and a temperature of 0°–20° C. Then, the product was salted out to give a monoazo compound represented, in the free acid form, by the following formula:

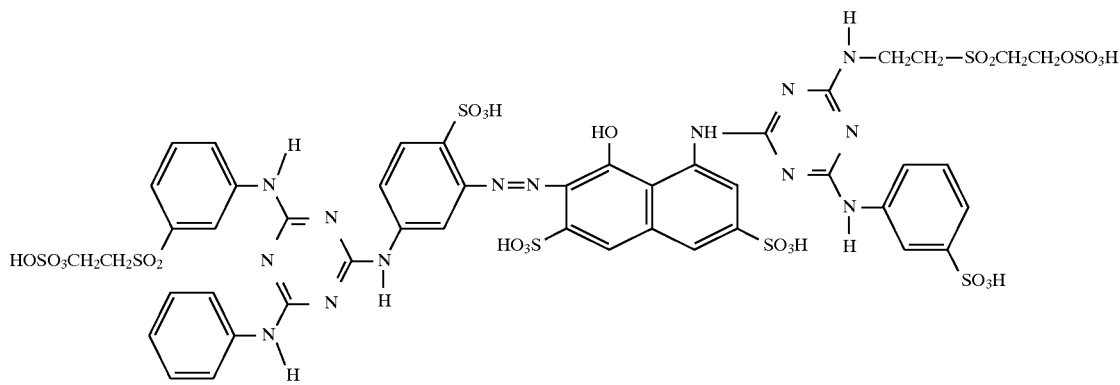

(wave length of the maximum absorption: $\lambda_{max}$=552 nm, in an aqueous medium)

Example 6

Using compounds shown in column 2, column 3, column 4, column 5, column 6 and column 7, in this order, of the following Tables 9–12 in place of 3-(2-sulfatoethylsulfonyl) aniline, aniline, 2,4-diaminobenzenesulfonic acid, 1 -amino-8-hydroxynaphthalene-3 ,6-disulfonic acid, 2-(2-sulfatoethylsulfonyl)ethylamine and 3-sulfoaniline used in Example 5, corresponding monoazo compounds were synthesized in a manner similar to that in Example 5. Using the monoazo compounds thus obtained, dyeing was conducted and dyed products having respective colors shown in the column 8 of the following Tables 9–12 were obtained.

The same compounds were obtained even when the order of the first condensation, the second condensation and the third condensation of the compounds shown in column 2, column 3, column 4, column 5, column 6 and column 7 of the Tables 9–12 to cyanuric chloride in the above syntheses was exchanged.

Also, the same compounds were obtained when syntheses were carried out in the same manner as in the above described syntheses except for using the corresponding hydroxyethylsulfonyl compounds in place of compounds in column 2 and column 6 of the Tables 9–12 and then sulfating the product in a conventional manner in the last step.

TABLE 9

| 1 | 2 | 3 | 4 | 5 | 6 | 7 | 8 |
|---|---|---|---|---|---|---|---|
| 1 | HOSO₃C₂H₄SO₂– (3-aminophenyl) | aniline | 2,4-diaminobenzenesulfonic acid (SO₃H, NH₂) | 1-amino-8-hydroxynaphthalene-3,6-disulfonic acid | H₂NC₂H₄SO₂C₂H₄OSO₃H | aniline | Red |
| 2 | ← | ← | ← | ← | 4-(H₂N)-C₆H₄-SO₂C₂H₄OSO₃H | 2-aminobenzenesulfonic acid | ← |
| 3 | HOSO₃C₂H₄SO₂C₂H₄NH₂ | 2-ethylaniline | ← | ← | ← | aniline | ← |
| 4 | HOSO₃C₂H₄SO₂C₂H₄NH₂ | aniline | ← | ← | 3-(H₂N)-C₆H₄-SO₂C₂H₄OSO₃H | ← | ← |
| 5 | CH₃–N(HOSO₃C₂H₄SO₂C₂H₄)– | 4-aminophenol | ← | ← | ← | 3-aminobenzenesulfonic acid | ← |

TABLE 10

| 1 | 2 | 3 | 4 | 5 | 6 | 7 | 8 |
|---|---|---|---|---|---|---|---|
| 6 | $HOSO_3C_2H_4SO_2C_2H_4NH_2$ | aniline | 2,4-diaminobenzenesulfonic acid | 4-amino-5-hydroxynaphthalene-2,7-disulfonic acid | $H_2NC_2H_4SO_2C_2H_4OSO_3H$ | aniline | Red |
| 7 | ← | 4-chloro-N-ethylaniline | ← | ← | 3-aminophenyl-$SO_2C_2H_4OSO_3H$ | 2-aminobenzenesulfonic acid | ← |
| 8 | ← | aniline | ← | ← | ← | N-methyl-o-toluidine | ← |
| 9 | $HOSO_3C_2H_4SO_2$-(4-methoxy)aniline | 4-methoxyaniline | ← | ← | ← | aniline | ← |
| 10 | ← | N-ethylaniline | ← | ← | $H_2NC_3H_6SO_2CH=CH_2$ | 3-aminobenzenesulfonic acid | ← |

TABLE 11

| 1 | 2 | 3 | 4 | 5 | 6 | 7 | 8 |
|---|---|---|---|---|---|---|---|
| 11 | HOSO₃C₂H₄SO₂C₂H₄NH₂ | aniline (NH₂) | 2,4-diaminobenzenesulfonic acid (SO₃H, NH₂, NH₂) | 4-amino-5-hydroxy-naphthalene-1,7-disulfonic acid (NH₂, OH, SO₃H, HO₃S) | 3-aminophenyl-SO₂C₂H₄OSO₃H | 3-aminobenzenesulfonic acid (H₂N, SO₃H) | Red |
| 12 | HOSO₃C₂H₄SO₂C₂H₄—OC₂H₄NH₂ | aniline (NH₂) | 2,4-diaminobenzenesulfonic acid (NH₂, SO₃H, NH₂) | ← | 3-aminophenyl-SO₂CH=CH₂ | 2-amino-1,4-benzenedisulfonic acid (SO₃H, H₂N, SO₃H) | ← |
| 13 | | 2-aminobenzenesulfonic acid (NH₂, SO₃H) | ← | 4-amino-5-hydroxy-naphthalene-2,7-disulfonic acid (NH₂, OH, SO₃H, HO₃S) | H₂NC₃H₆SO₂C₂H₄OSO₃H | N-methylaniline (HN—CH₃) | ← |
| 14 | | 4-chloroaniline (NH₂, Cl) | 1,5-diamino-8-sulfonic naphthalene (SO₃H, NH₂, H₂NCH₂) | ← | ← | aniline (H₂N) | ← |
| 15 | HOSO₃C₂H₄SO₂ (m-substituted phenyl with NH₂) | 4-methylaniline (NH₂, CH₃) | ← | 4-amino-5-hydroxy-naphthalene-2,7-disulfonic acid (NH₂, OH, SO₃H, HO₃S) | 4-aminophenyl-SO₂CH=CH₂ | 3-aminobenzenesulfonic acid (H₂N, SO₃H) | ← |

TABLE 12

| 1 | 2 | 3 | 4 | 5 | 6 | 7 | 8 |
|---|---|---|---|---|---|---|---|
| 16 |  H$_2$N–⌬–SO$_2$C$_2$H$_4$OSO$_3$H | HOC$_2$H$_4$NH$_2$ |  H$_2$N–⌬–SO$_3$H (2,4) |  1,5-dihydroxy-naphthalene-2,6-disulfonic acid with NH$_2$ | H$_2$NC$_2$H$_4$SO$_2$C$_2$H$_4$OSO$_3$H |  aniline | Red |
| 17 | ← |  morpholine | ← | ← | H$_2$NC$_3$H$_6$SO$_2$CH=CH$_2$ | 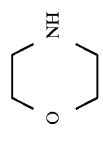 m-aminobenzenesulfonic acid | ← |
| 18 | HOSO$_3$C$_2$H$_4$SO$_2$C$_2$H$_4$NH$_2$ |  aniline | ← | ← |  H$_2$N–⌬–SO$_2$C$_2$H$_4$OSO$_3$H |  nicotinic acid | ← |
| 19 | ← |  nicotinic acid |  1,5-diamino-naphthalene-sulfonic acid | ← | ← |  phenol | ← |
| 20 | HOSO$_3$C$_2$H$_4$SO$_2$–⌬–NH$_2$ | C$_2$H$_5$NH$_2$ | ← | ← | ← | H$_2$NC$_2$H$_4$SO$_3$H | ← |

Example 7

Into 200 parts of water was dissolved 0.3 part of monoazo compound obtained in Example 1. Then 20 parts of sodium sulfate and 10 parts of cotton were added to the solution and the solution was heated to 60° C. After 30 minutes at 60° C., 4 parts of sodium carbonate was added thereto and dyeing was effected for an hour. Then, the products were subjected to rinsing and soaping. The dyeing waste had only a little color. The dyed product had a level and deep red color. The dyed product was good in various fastness including chlorine resistance, light resistance, perspiration resistance, perspiration-sunlight resistance, acid-hydrolysis resistance and alkali resistance.

Example 8

Dyeing was carried out according to Example 7 except that each of the monoazo compounds obtained in Examples 2–6 was used in place of the monoazo compound obtained in Example 1 used in Example 7. The dyeing waste had only a little color. The dyed product had a level and deep red color. The dyed product was good in various fastness including chlorine resistance, light resistance, perspiration resistance, perspiration-sunlight resistance, acid-hydrolysis resistance and alkali resistance.

Example 9

Dyeing was carried out according to Examples 7 and 8 except that the amount of sodium sulfate was changed from 20 parts to 10 parts. The obtained dyed products had comparable quality to those of the dyed products obtained in Examples 7 and 8, respectively.

Example 10

Dyeing was carried out according to Examples 7 and 8 except that the amount of sodium sulfate was changed from 20 parts to 4 parts. The obtained dyed products had comparable quality to that of the dyed products obtained in Examples 7 and 8, respectively.

Example 11

Dyeing was carried out according to each of Examples 7–10 except that the dyeing temperature was changed from 60° C. to 70° C. The obtained dyed products had comparable quality to that of the dyed products obtained in Examples 7–10, respectively.

Example 12

Dyeing was carried out according to each of Examples 7–10 except that 0.3 part of the respective monoazo compounds were replaced by 0.3 part of respective monoazo compounds plus 0.06 part of sodium salt of, a condensation product of methylnaphthalenesulfonic acid and formaldehyde having a degree of sulfonation of 110% and a degree of average polymerization of 1.8. The obtained dyed products had comparable quality to that of the dyed products obtained in Examples 7–10, respectively.

Example 13

Using monoazo compounds obtained in Examples 1–6, color pastes having the following compositions, respectively, were prepared.

| Composition of color paste | |
|---|---|
| Monoazo compound | 5 parts |
| Urea | 5 parts |
| Sodium alginate (5%) stock paste | 50 parts |
| Hot water | 25 parts |
| Sodium hydrogen carbonate | 2 parts |
| Balance (water) | 13 parts |
| Total | 100 parts |

The color pastes were printed onto a mercerized cotton broad cloth, which was worked up by subjecting to intermediate drying, steaming at 100° C. for 5 minutes, rinsing with warm water, soaping, rinsing with warm water and drying, in this order. The printed product had a level and deep red color. The obtained printed product was good in various fastness including chlorine resistance, light resistance, perspiration resistance, perspiration-sunlight resistance, acid-hydrolysis resistance and alkali resistance.

What is claimed is:

1. A monoazo compound represented by the following general formula (I):

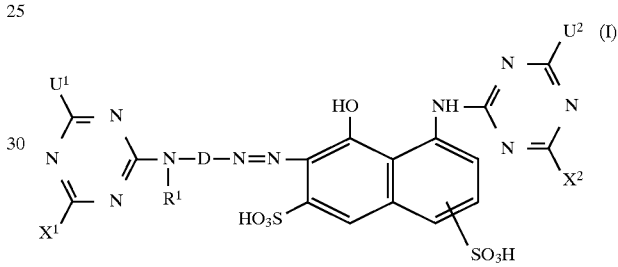

wherein $R^1$ represents a hydrogen atom or alkyl which may be optionally substituted;

D represents a group of the following general formula (II) or (III):

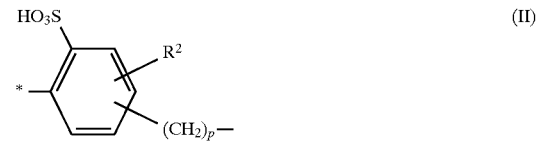

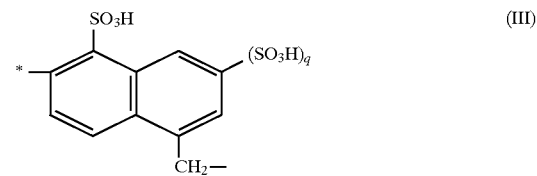

wherein * indicates the bond attached to the azo group, $R^2$ represents a hydrogen atom, lower alkyl, lower alkoxy, or sulfo, and p and q, which are the same as or different from each other, each represent 0 or 1;

$U^1$ and $U^2$, which are the same as or different from each other, each represent a group of the following general formula (U1), (U2) or (U3):

-continued

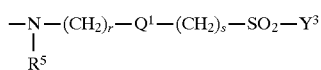 (U2)

$$-N(R^5)-(CH_2)_r-Q^1-(CH_2)_s-SO_2-Y^3 \quad (U3)$$

wherein $R^3$, $R^4$ and $R^5$, which are the same or different from each other, each represent a hydrogen atom or alkyl which may be optionally substituted, $A^1$ represents phenylene which may be optionally substituted or naphthylene which may be optionally substituted, $A^2$ represents alkylene which may be optionally substituted, $Q^1$ represents —O—, —S— or —NR$^6$— wherein $R^6$ represents a hydrogen atom, alkyl which may be optionally substituted or phenyl which may be optionally substituted, r and s, which are the same as or different from each other, each represent 2, 3 or 4, and $Y^1$, $Y^2$ and $Y^3$, which are the same as or different from each other, each represent —CH=CH$_2$ or —CH$_2$CH$_2$Z wherein Z represents a group which can be eliminated by the action of an alkali; and $X^1$ and $X^2$, which are the same as or different from each other, each represent halogeno, pyridinio which may be optionally substituted or a group of the following general formula (X1), (X2), (X3) or (X4):

 (X1)

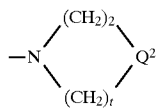 (X2)

 (X3)

 (X4)

wherein $R^7$, $R^8$, $R^9$ and $R^{10}$, which are the same as or different from each other, each represent a hydrogen atom, alkyl which may be optionally substituted, phenyl which may be optionally substituted or naphthyl which may be optionally substituted, $Q^2$ represents —CH$_2$—, —O—, —S—, —SO—, —SO2— or —NR$^{11}$- wherein $R^{11}$ represents a hydrogen atom or alkyl which may be optionally substituted, and t represents 1, 2 or 3;

with the proviso that at least one of $X^1$ and $X^2$ represents pyridinio which may be optionally substituted or a group of the general formula (X1), (X2), (X3) or (X4); or a salt thereof.

2. A monoazo compound according to claim 1, wherein at least one of $X^1$ and $X^2$ is a group of the general formula (X1) or (X2), or a salt thereof.

3. A monoazo compound according to claim 2, wherein both of $X^1$ and $X^2$, which are the same as or different from each other, are a group of the general formula (X1) or (X2), or a salt thereof.

4. A monoazo compound according to claim 2, wherein at least one of $X^1$ and $X^2$ is a group of the general formula (X1), or a salt thereof.

5. A monoazo compound according to claim 4, wherein at least one of $X^1$ and $X^2$ is a group of the general formula (X1) and the other is chloro, or a salt thereof.

6. A monoazo compound according to claim 4, wherein both of $X^1$ and $X^2$, which are the same as or different from each other, are a group of the general formula (X1), or a salt thereof.

7. A monoazo compound according to claim 4, wherein at least one of $X^1$ and $X^2$ is a group of the general formula (X1) wherein one of $R^7$ and $R^8$ is a hydrogen atom, methyl or ethyl and the other is phenyl which may be optionally substituted, or a salt thereof.

8. A monoazo compound according to claim 1, wherein at least one of $U^1$ and $U^2$ is a group of the general formula (U2) or (U3), or a salt thereof.

9. A monoazo compound according to claim 8, wherein at least one of $U^1$ and $U^2$ is a group of the general formula (U2), or a salt thereof.

10. A monoazo compound according to claim 9, wherein at least one of $U^1$ and $U^2$ is a group of the general formula (U2), wherein $A^2$ is ethylene or trimethylene and $R^4$ is a hydrogen atom, or a salt thereof.

11. A monoazo compound according to claim 8, wherein at least one of $U^1$ and $U^2$ is a group of the general formula (U3), or a salt thereof.

12. A monoazo compound according to claim 11, wherein at least one of $U^1$ and $U^2$ is a group of the general formula (U3) wherein $Q^1$ is —O—and both of r and s are 2, or a salt thereof.

13. A monoazo compound according to claim 1, wherein D is a group of the general formula (II), or a salt thereof.

14. A monoazo compound according to claim 13, wherein D is a group of the general formula (II) wherein $R^2$ is methyl or methoxy, or a salt thereof.

15. A monoazo compound according to claim 13, wherein D is a group of the general formula (II) and p is 0, or a salt thereof.

16. A monoazo compound according to claim 1, wherein $R^1$ is a hydrogen atom, methyl or ethyl, or a salt thereof.

17. A monoazo compound according to claim 1, wherein $R^3$, $R^4$ and $R^5$ are a hydrogen atom, methyl or ethyl, or a salt thereof.

18. A monoazo compound according to claim 1, wherein $Y^1$, $Y^2$ and $Y^3$ are —CH=CH$_2$ or —CH$_2$CH$_2$OSO$_3$H, or a salt thereof.

19. A monoazo compound according to claim 18, wherein $Y^1$, $Y^2$ and $Y^3$ are —CH$_2$CH$_2$OSO$_3$H, or a salt thereof.

20. A process for dyeing or printing a fiber material which comprises applying to the fiber material a monoazo compound according to claim 1 or a salt thereof.

* * * * *